(12) United States Patent
Wiatrowski et al.

(10) Patent No.: US 7,499,441 B2
(45) Date of Patent: Mar. 3, 2009

(54) METHOD FOR ALLOWING A SUBSCRIBER UNIT TO ACCESS A CHANNEL FOR VOICE TRANSMISSIONS

(75) Inventors: David G. Wiatrowski, Woodstock, IL (US); Thomas B. Bohn, McHenry, IL (US); Thomas J. Senese, Schaumburg, IL (US); John P. Belmonte, Elk Grove Village, IL (US); Terry K. Mansfield, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 440 days.

(21) Appl. No.: 10/984,431

(22) Filed: Nov. 9, 2004

(65) Prior Publication Data
US 2006/0013188 A1 Jan. 19, 2006

Related U.S. Application Data

(60) Provisional application No. 60/583,723, filed on Jun. 29, 2004.

(51) Int. Cl.
*H04B 7/212* (2006.01)
*H04Q 11/00* (2006.01)
(52) U.S. Cl. ...................... 370/347; 370/260
(58) Field of Classification Search ............... 370/321, 370/260, 261, 347; 455/518, 519; 709/204, 709/205; 348/14.08, 14.09, 14.1, 14.11
See application file for complete search history.

(56) References Cited

U.S. PATENT DOCUMENTS

| 5,678,193 | A | * | 10/1997 | Helm et al. ................. 455/503 |
| 6,035,206 | A | * | 3/2000 | Thurston et al. ............ 455/503 |
| 6,360,093 | B1 | * | 3/2002 | Ross et al. ................ 455/414.1 |
| 2003/0012149 | A1 | * | 1/2003 | Maggenti et al. ............ 370/260 |
| 2003/0016632 | A1 | | 1/2003 | Refal |
| 2005/0113123 | A1 | * | 5/2005 | Torvinen ..................... 455/519 |
| 2005/0122923 | A1 | | 6/2005 | Jang |
| 2005/0197146 | A1 | * | 9/2005 | Rao et al. ................... 455/519 |

* cited by examiner

*Primary Examiner*—George Eng
*Assistant Examiner*—Michael Faragalla
(74) *Attorney, Agent, or Firm*—Indira Saladi; Valerie M. davis

(57) ABSTRACT

In a TDMA system whereby the TDMA system comprises a plurality of subscriber units and a plurality of base radios, a method and system for providing access to a channel for voice transmissions where the first subscriber unit determines whether it is provisioned for polite access to the channel. In addition, the first subscriber unit is characterized by a first color code and a first talkgroup ID. The first subscriber unit also examines the voice transmissions on the channel for voice transmissions that are from a second subscriber unit with a second color code and a second talkgroup ID. If the first color code and the second color code match and if the first talkgroup ID and the second talkgroup match, then the first subscriber unit is allowed access to the channel for voice transmissions even though the channel is being used for voice transmissions by the second subscriber unit.

18 Claims, 4 Drawing Sheets

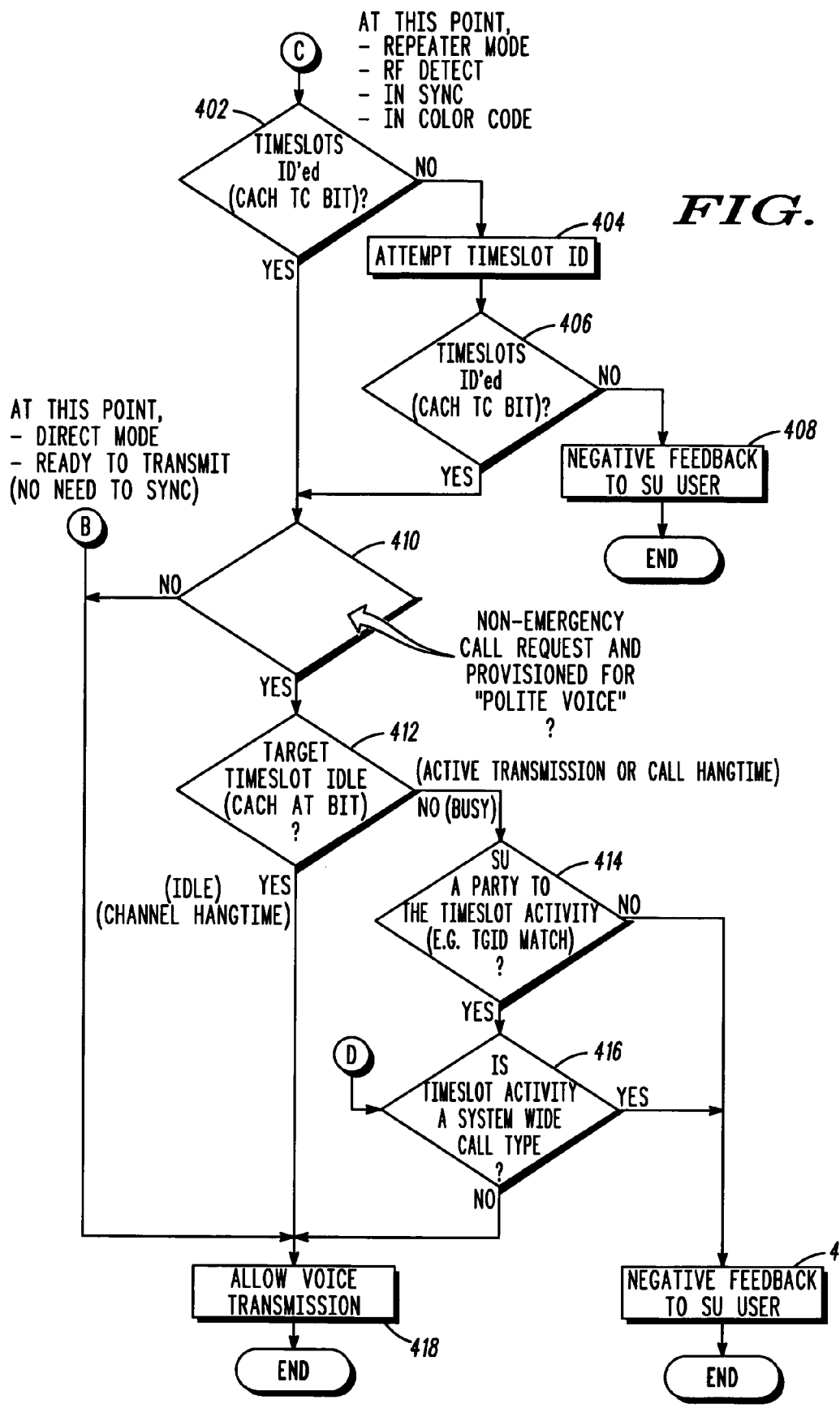

METHOD FOR ALLOWING A SUBSCRIBER UNIT TO ACCESS A CHANNEL FOR VOICE TRANSMISSIONS

FIELD OF THE INVENTION

The present invention relates generally to wireless communications systems and more specifically to voice transmissions in a wireless communications system.

BACKGROUND OF THE INVENTION

A wireless communications system may generally comprise a set of "subscriber units," typically subscriber units are the endpoints of a communication path, and a set of "base radios," typically stationary and the intermediaries by which a communication path to a subscriber unit (SU) may be established or maintained. One such type of system is a time division multiple access (TDMA) communication system where the radio medium is divided into time slots to carry the communications of the system. Because the radio medium is a shared medium, there is a need for managing access to the radio medium and allowing the SUs to utilize the radio medium for voice communications.

Specifically, for a SU to make a transmission, the SU must first activate a base radio (BR) and acquire synchronization. Once synchronization is obtained, the SU requests that a call be setup and then transmits on the radio medium. Because activating a BR and synchronization are necessary, extra time is required to place a call. Thus, it is desirable to avoid these procedures to decrease the amount of time it takes to place a call. Further, there are cases where certain SUs need preferential access to the radio medium and need to be given access to the radio medium to transmit during the context of an active call.

Thus, there exists a need for providing access to a channel for voice communications.

BRIEF DESCRIPTION OF THE FIGURES

A preferred embodiment of the invention is now described, by way of example only, with reference to the accompanying figures in which:

FIG. 4 is a further continuation of the examples shown in FIGS. 2 and 3.

Figure 1:
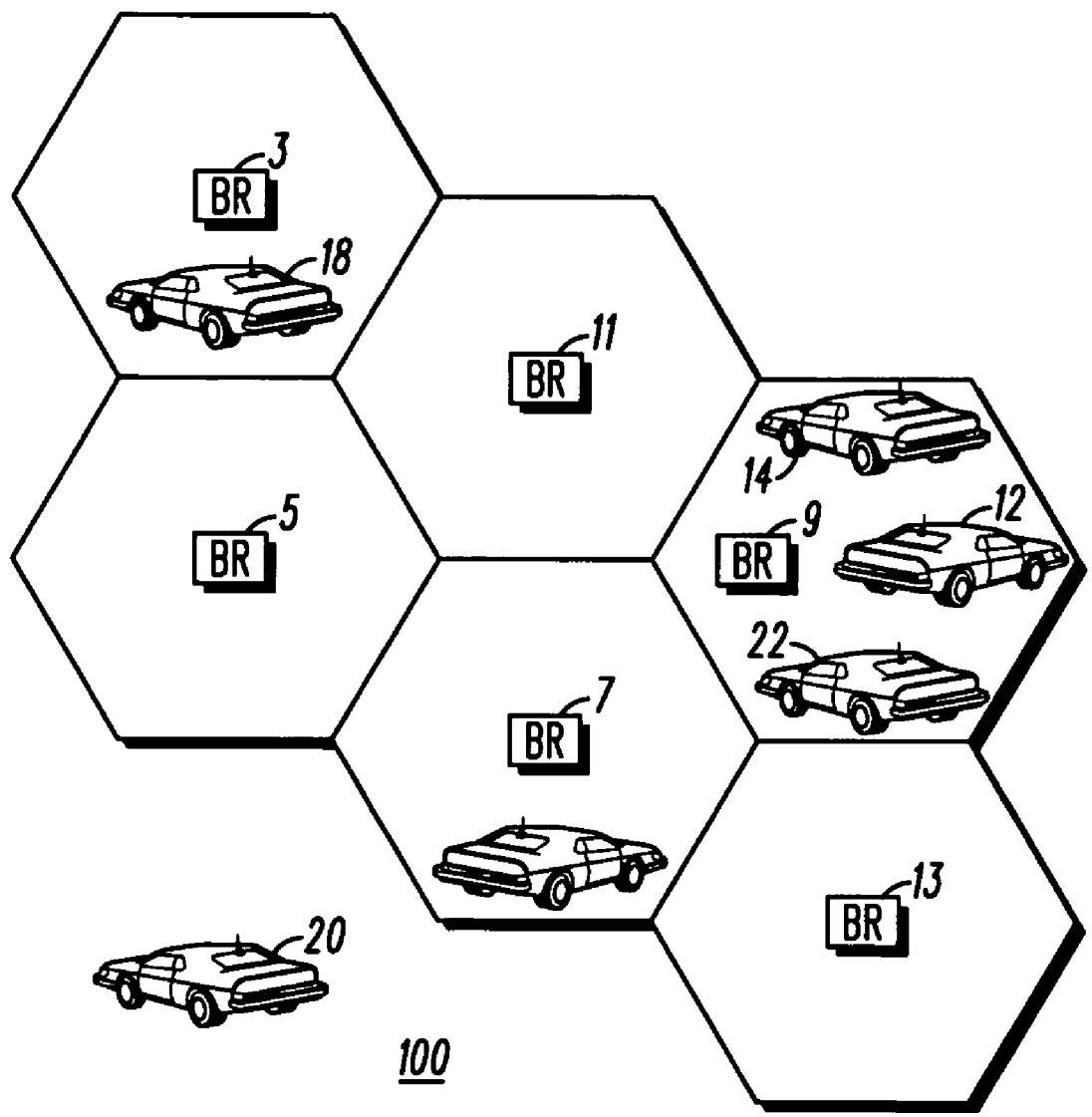
FIG. 1 is a block diagram of an example wireless communications system in accordance with an embodiment of the invention.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION OF THE PREFERRED EMBODIMENT

Referring now to FIG. 1, there is shown an example of the method and apparatus of the present invention as it may be employed and incorporated into a typical wireless communications system 100. The illustrated example comprises a plurality of cells, each with a base radio (BR) 3, 5, 7, 9, 11, 13 typically located at the center of the cell, and a plurality of subscriber units 12, 14, 16, 18, 20, 22. The subscriber units 12, 14, 16, 18, 20, 22 send and receive communications with the base radios 3, 5, 7, 9, 11, 13.

A subscriber unit (SU) preferably comprises mobile or portable devices (such as an in-car or handheld radios or radio telephones) capable of communicating with a BR using time division multiple access (TDMA) or time division duplex (TDD) techniques as further described herein, in which specified time segments are divided into assigned time slots for individual communication. Even though an embodiment of the present invention is described with reference to TDMA, e.g. as shown in the accompanying figures, as is known to one of ordinary skill in the art, frequency division multiple access (FDMA) and other wireless communications may be used. In an exemplary embodiment of the present invention, the wireless communications system 100 assumes a two slot TDMA communications system, however, other slotting ratios may be used in the TDMA communications system and still remain within the spirit and scope of the present invention. For example, one slot may be used and as such, the one slot wireless communications system may be considered a FDMA wireless communications system. In an exemplary embodiment, a SU initiates a voice communication by pressing PTT (push to talk) which sends a request for the radio medium to a BR.

A BR preferably comprises fixed equipment for communicating data/control and voice information to and from the SUs for facilitating communications between the SUs in the wireless communications system 100. An illustrative embodiment of the present invention includes a BR that dekeys 5 seconds after determining that there is no valid SU activity present on the radio medium. In an exemplary embodiment, such a timer is termed a Subscriber Inactivity Timer (SIT). In such an embodiment, the SIT dekeys 5 seconds after determining that there is no valid SU activity on either of the two timeslots of the TDMA communications system. The SIT is started when there is no valid SU activity present on the radio medium and the SIT is stopped whenever the BR determines that there is valid SU activity on the radio medium. In yet another illustrative embodiment, the wireless communications system 100 includes a BR that also dekeys after 180 seconds. Such a time period is provisioned in a BR and is termed a Time Out Timer (TOT). When a new SU transmission is detected on the radio medium, the TOT is reset. The TOT is stopped when the BR dekeys due to a SIT timeout and the BR dekeys when the TOT expires which ends any in progress communications.

Communications initiated or repeated by a BR and sent to a subscriber unit (SU) are termed downlink and communications initiated by a SU and sent to a BR are termed uplink. In an exemplary embodiment, each BR 3, 5, 7, 9, 11, 13 does not continually transmit downlink communications but each BR maintains synchronized communications so that time slots sent between a BR and a SU are synchronized based upon the BR downlink.

In an illustrative embodiment, synchronization is provided by a message that identifies the center of a TDMA burst. In either a SU or a BR, a receiver uses a matched filter and a correlator to perform symbol recovery and to identify the center of the TDMA burst. Once the receiver is synchronized to a channel, the receiver uses pattern matching to detect the presence of a message that identifies whether the channel is present and synchronized. The message identifies the type of synchronization present on the channel. In an illustrative embodiment, the message is used to differentiate a) voice bursts from data/control bursts and from reverse channel bursts, b) inbound channels from outbound channels, c) the type of modulation on the channel, e.g. a Motorola P25 Phase 1 FDMA from a Motorola P25 Phase 2 TDMA, and d) the type of wireless communications system, e.g. a Motorola P25 system from a Motorola Low Tier Digital system.

As used herein, the terms "communication" and "transmission" are used interchangeably and, in one embodiment, refer to contiguous TDMA bursts emanating from one radio in one timeslot. As such, transmissions may generically refer to voice, data or control information relating to the wireless communications system 100. The term "call" refers to related voice transmissions between SUs in the wireless communications system 100. In an exemplary embodiment, the voice transmissions in a call are separated by idle time which is signaled by a message notifying subscribers that the radio medium is idle. Further, since the idle time occurs on the uplink, the message notifying subscribers that the radio medium is idle is sent on the downlink.

As is known in the art, the term "burst" refers to the smallest standalone unit of a transmission, e.g. a TDMA or FDMA transmission. In an illustrative embodiment, for a burst found in a Motorola Low Tier Digital system, a defined transmission is 216 bits of payload and 48 bits of synchronization or embedded signaling. The defined transmission takes 27.5 msec to transmit and there is 1.25 msec of guard time on either side of the actual transmission. Thus, a "burst" in such a Motorola Low Tier Digital system is 30 msec.

Before accessing the radio medium (also known in the art as "channel") for voice communication, the SU considers the mode that the requested voice communication requires. For example, the SU may transmit voice communications in either repeater mode or talkaround mode. If the requested voice communication requires repeater mode, then the SU needs a BR to complete the voice communication. In an illustrative embodiment, repeater mode is defined as a SU voice transmission where the SU transmits on the uplink frequency and sources RF energy to the BR. The BR then transfers the voice transmission to the downlink frequency and sources RF energy to a target SU. If the requested voice communication requires talkaround mode, then the SU does not need a BR to complete the voice communication. In an illustrative embodiment, talkaround mode is defined as a SU voice transmission where the SU transmits on the downlink frequency and sources RF energy to a target SU. As is known in the art, talkaround mode is also known as direct mode and is characterized as a SU voice transmission where the SU transmits on the downlink frequency without the assistance of a BR.

In an illustrative embodiment, RF energy may be sourced by either a SU or a BR where sourced means to transmit on the channel. Additionally, the communication between the SU and a BR may be either voice or data/control. Thus, there are four types of communications on the channel: SU-Sourced Voice, SU-Sourced Data(/Control), BR-Sourced Voice, and BR-Sourced Data(/Control). For the receiver in either the SU or the BR to understand what type of communication is sent and properly process the communication, the communication contains a 48-bit (24-symbol) frame synchronization word to identify the communication type.

Before accessing the channel for voice communication, the SU considers a provisioned characteristic of the SU. A provisioned characteristic of the SU is a programmed attribute or feature which instructs the SU how to operate. In an illustrative embodiment, Customer Provisioning Software (CPS) (also known as Radio Service Software (RSS)), manufactured by Motorola, Inc., is used for assigning the SU a provisioned characteristic. For example, the SU can access the channel with a provisioned characteristic of being "polite," where being "polite" means that the SU considers what type of communications are currently on the channel before accessing the channel for its own communication. In an exemplary embodiment, being "polite" is subdivided into being "polite" to all voice communications on the channel and being "polite" to only other voice communications on the channel from other SUs with a same color code. A SU that is being "polite" to all means that the SU is "polite" to any detected channel activity.

If a SU is not "polite," then it has a provisioned characteristic of "impolite," where being "impolite" means that a SU commences with its transmission without first verifying that the channel is available and clear. In an exemplary embodiment, an "emergency" communication is one type of "impolite" communication.

As is known in the art, "color code" is a common identifier used by a group of SUs which utilize the same BR. For example, as shown in FIG. 1, SUs 12, 14, 22 are in one color code because they utilize the same BR, namely BR 9. Further, a color code field may be present in an embedded signaling message and general data burst to provide a means of addressing a radio network or a specific repeater so that co-channel interference may be rejected. Further known in the art, a "talkgroup" is a group of SUs that share an RF frequency and timeslot and have the same color code. In an illustrative embodiment, a talkgroup is identified by a 16-bit talkgroup identifier (TGID) and an individual subscriber unit is identified by a 24-bit subscriber unit identifier (SUID). Thus, in an illustrative embodiment, SUs that share a color code are further subdivided into talkgroups so that SUs in one talkgroup do not hear SUs in another talkgroup.

In an exemplary embodiment, the SU in direct mode and a provisioned characteristic of being "impolite" has access to the channel to transmit voice communications without considering whether the channel is busy or without considering any other factors of the channel.

In an exemplary embodiment, the SU in direct mode and a provisioned characteristic of being "polite" to all others regardless of color code is allowed access to the channel unless there is RF energy on the channel. The term "RF energy on the channel" means that the RF energy on the channel exceeds a threshold that is provisioned in the SU. Thus, in an exemplary embodiment, the SU is prohibited from accessing the channel when the measured RF energy level on the channel is greater than the CPS characteristic for channel access. Additionally, if the SU is a party to a call, the SU is allowed to transmit "impolitely" where impolitely means that the SU commences to transmit on top of a voice transmission.

In an exemplary embodiment, the SU in direct mode and a provisioned characteristic of being "polite" to SUs of the same color code is allowed access to the channel unless there is RF energy on the channel or unless the voice transmissions on the channel match the color code of the SU. Thus, the SU considers whether RF energy is on the channel and determines the color code of the voice transmission before allowing or disallowing a requested voice transmission. Such a transmission requires time slot synchronization to determine the color code of the voice transmission on the channel. Additionally, if the SU is a party to a call, the SU is allowed to transmit "impolitely" where impolitely means that the SU commences to transmit on top of a voice transmission.

In an exemplary embodiment, the SU in repeater mode and a provisioned characteristic where the SU is "impolite" to voice communications on the channel requires the SU to synchronize to the BR downlink, verify the correct color code, and identify the channels before allowing a voice communication. In an exemplary embodiment, synchronization to the BR may require execution of a BR wakeup procedure if the BR is not awake, specifically if the BR downlink is not active. The SU in repeater mode with a provisioned characteristic of being "impolite" does not provide protection to a call or transmission on the channel. Thus, regardless of whether the voice transmission is analog or digital, of the same color code or not, or of the same call or not, an "impolite" SU accesses the channel for its own communication.

In an exemplary embodiment, if the SU is in repeater mode and has a provisioned characteristic where the SU is "polite" to all voice communications on the channel, the SU is allowed access to the channel only after considering the state of the channel. If the SU is in repeater mode and is "polite" to all voice communications, transmissions of co-channel users are protected whether those transmissions are analog or digital, same color code or not, same call or not. Additionally, if the SU is a party to an ongoing call, the SU is allowed to transmit impolitely where impolitely means "on top of" an in-progress active transmission. If the SU is not a party to an ongoing call, then the SU is not allowed access to the channel. In operation, such a combination requires the SU to consider whether there is RF energy on the channel, requires synchronization of the BR downlink, verifying the correct color code, and identifying the channels before accessing the channel for a voice communication. Further, synchronization to the BR may require execution of a BR wakeup procedure if the BR is not awake, specifically if the BR downlink is not active.

In an exemplary embodiment, the SU in repeater mode and a provisioned characteristic of being "polite" to the same color code allows a SU access to the radio channel only after considering the state of the channel. Such a combination protects digital co-channel users that use the same color code. Additionally, if the SU is a party to any ongoing call or transmission, the SU is allowed to transmit impolitely. Similar to the above situation where the SU is in repeater mode and has a provisioned characteristic of being "impolite", the SU is required to consider RF energy detect, synchronize to the BR downlink, verify the correct color code, and identify the channels before allowing a voice transmission. Further, synchronization to the BR may require execution of a BR wakeup procedure if the BR is not awake, specifically if the BR downlink is not active.

Figure 2:
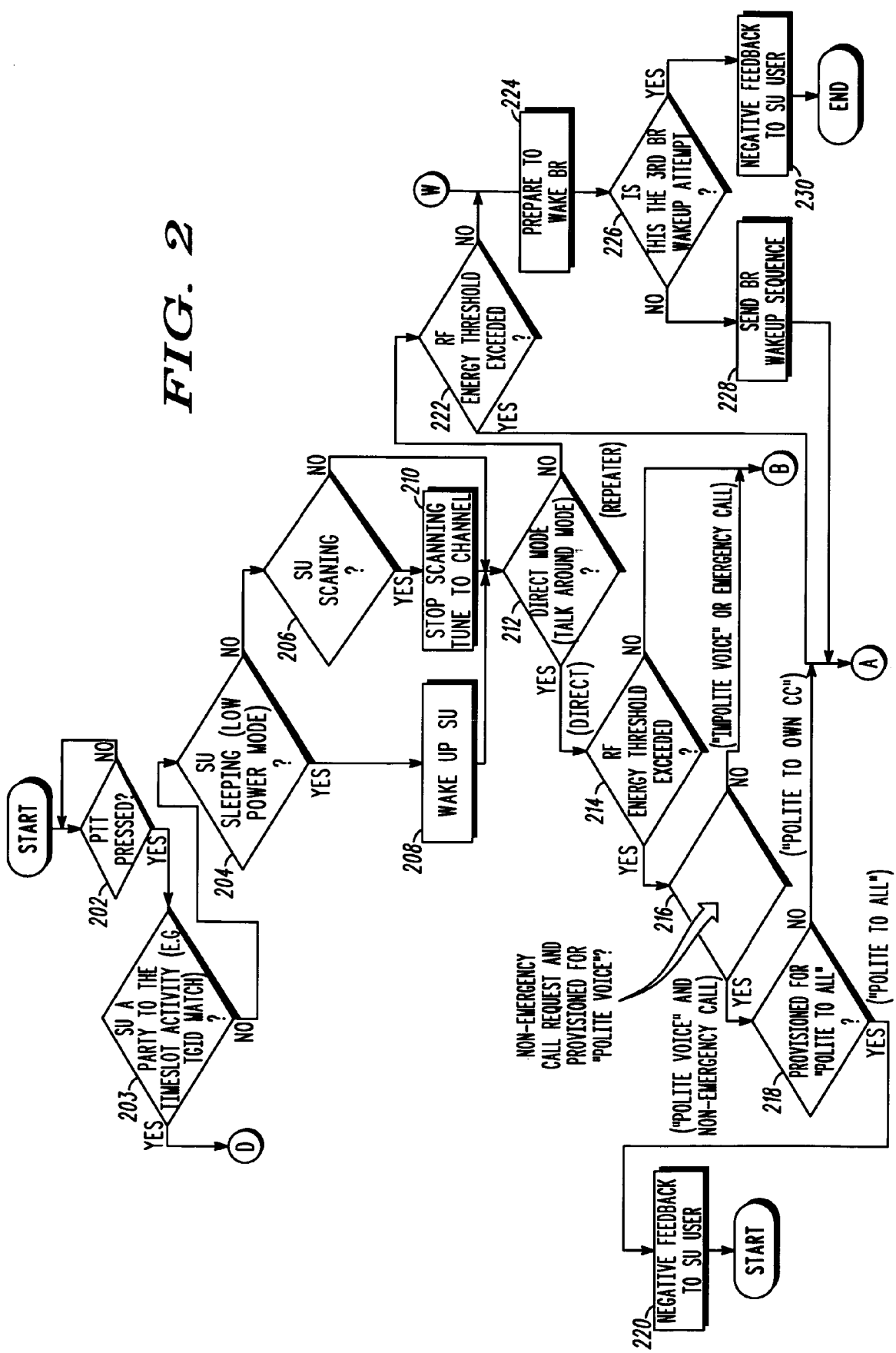
FIG. 2 is a flow diagram of an example method for providing channel access for voice transmissions.
Figure 3:
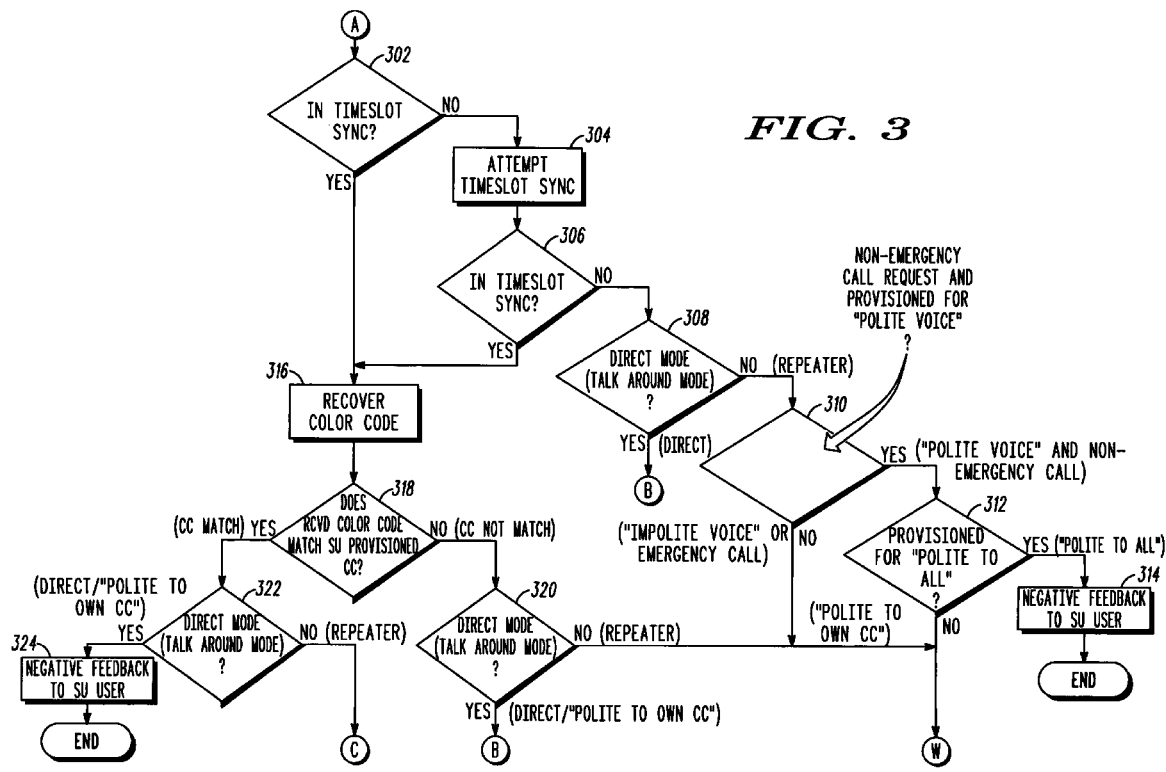
FIG. 3 is a continuation of the example shown in FIG. 2.

Referring to FIGS. 2-4, in operation, the subscriber unit must be awake and request access for a voice transmission. As shown in FIG. 2, the subscriber unit requests a voice transmission by pressing PTT (Block 202). If PTT is pressed, then the SU checks to see whether it is a party to an ongoing call (Block 203). If the SU is a party to an ongoing call (Block 203), then the SU may be allowed to access the channel for voice transmission (Block 416). If the SU is not, then the SU must be awakened (Block 208) if the SU is already not awake (Block 204). If the SU is awake, then a determination of whether the SU is scanning RF channels is made (Block 206). If the SU is scanning, then the SU stops scanning and tunes to a specific frequency to request voice transmission (Block 210). If the SU is not scanning, then the process continues.

Continuing, the SU requests a voice transmission. If the SU requests a voice transmission in a direct mode (Block 212) where a repeater is not necessary for the communication, then the SU monitors the channel for RF energy (Block 214). Direct mode is also known as a talkaround mode. If the SU requests a voice transmission that is not a direct mode (Block 212), also known as a repeater mode, then the SU monitors the channel for RF energy (Block 222). In an illustrative embodiment, direct mode is where the SU transmits on the downlink frequency using SU-sourced synchronization and repeater mode is where the SU transmits on the uplink frequency using SU-sourced synchronization.

In direct mode, if an RF energy threshold is exceeded (Block 214), then the SU searches for synchronization and color code information. Refer to the above discussion of synchronization and color code for further explanation. From the synchronization and color code information, the SU determines whether the voice transmission is a non-emergency call and provisioned for "polite" channel access (Block 216). Further, if the "polite" channel access specifies that the SU be "polite" to all (Block 218), then the SU sends negative feedback to the SU user (Block 220). Thus, the voice transmission is not transmitted on the radio channel. Alternatively, if the "polite" channel access specifies that the SU not be "polite" to all (Block 218), but be "polite" to own color code (Block 218), then the SU determines whether the time slot is in synchronization, as shown in FIG. 3 (Block 302).

Further, if in direct mode and the RF energy is not exceeded (Block 214), then the SU is ready to transmit, as shown in FIG. 4 (Block 418). Also, if in direct mode and the RF energy threshold is exceeded (Block 214) and the voice transmission is either an emergency call or the voice transmission is "impolite," (Block 216), then the SU is allowed to perform voice communication using the radio channel, as shown in FIG. 4 (Block 418).

In repeater mode, if the RF energy threshold is not exceeded (Block 222), then the base repeater (BR) needs to be awakened (Block 224) if the BR is not already awake. The wake up procedure (Block 224) is initiated by the SU transmitting a one slot wakeup message to the BR (Block 228). The wakeup message is an idle message carrying the synchronization and the color code information. The BR verifies that the color code is correct and activates the downlink. Thus, as shown in FIG. 2, the voice transmission request is not allowed if the BR is not keyed up or if a wakeup procedure is unsuccessful in waking the BR. If the BR wakeup attempt is unsuccessful after two attempts (Block 226), negative feedback is given to the SU user (Block 230).

Further, in repeater mode, if the RF energy threshold is exceeded, then the SU determines whether the time slot is in synchronization, as shown in FIG. 3 (Block 302). Again, as mentioned above, when the RF energy threshold is exceeded, then the SU will search for synchronization and color code information.

Referring now to FIG. 3, the SU first checks to see if communication between the SU and the BR is in synchronization (Block 302). If it is not, the SU attempts to perform synchronization (Block 304). After attempting synchronization (Block 304), the SU checks the mode (Block 308), the type of communication (Block 310), e.g. emergency or non-emergency, and the type of "politeness," (Blocks 310, 312) e.g. "polite" to all, "polite" to own color code, or "impolite." If the SU is not able to synchronize communication between the BR and SU and checks for the above parameters, then negative feedback is given to the user (Block 314).

In an exemplary embodiment, performing synchronization between the BR and the SU (Block 304) involves waiting a predetermined period of time for detecting a time slot synchronization signal. The time slot synchronization signal is a 48 bit (also known as 24 symbols) frame sync word. For a single timeslot, the timeslot synchronization signal is available once every 360 msec during a voice call and may be available once every 60 msec during other conditions including during call hangtime, channel hangtime, and data transmission. Performing synchronization (Block 304) is complete upon detection of the time slot synchronization signal within a predetermined period of time (Block 306).

If the communication between the SU and the BR is in synchronization (Block 302) or the SU is successfully able to perform synchronization between the BR and the SU (Block 304), then the SU recovers the color code from the TDMA channel (Block 316). In an exemplary embodiment, the recovered color code is available in every burst except for a burst containing voice synchronization. Further, in an exemplary embodiment, the SU matches the recovered color code with the SU provisioned color code twice before a match is said to have occurred (Block 318). If the recovered color code matches a SU provisioned color code in the SU (Block 318) and the SU is in direct mode, then the SU is not allowed to transmit and negative feedback is given to the SU user (Block 324). If in direct mode (Block 320) and the recovered color code does not match the SU provisioned color code (Block 318), then the SU is allowed to perform voice communication using the radio channel, as shown in FIG. 4 (Block 418).

Referring now to FIG. 4, there are a number of situations where negative feedback is given to the SU user (Blocks 408, 420). One situation is where the SU is in repeater mode, has detected RF energy, is in synchronization with the BR, and the recovered color code matches the provisioned color code, but the SU is not able to identify which time slot is one and which time slot is two within a predetermined time period (Block 404). In one embodiment, the SU determines time slot numbering by decoding a TDMA channel field in a Common Announcement Channel (CACH) message. In an exemplary embodiment, the SU matches the TDMA channel field in the CACH message twice, before the time slot numbering is determined (Block 404). If the SU is not able to determine the time slot numbering within a predetermined time period (Block 406), then negative feedback is given to the SU user (Block 408).

Additionally, if the SU determines that the voice transmission is a non-emergency call and provisioned for "polite" channel access (Block 410), and the time slot is being used for system wide communication (Block 416) or the time slot is busy being used by another SU (Block 414), then negative feedback is given to the SU user (Block 420). In all other cases, the SU is allowed to perform voice communication using the radio channel (Block 418). For example, if a "polite" SU has its emergency feature activated, then the SU is behaving "impolitely" and has access to the channel.

For the SU to allow voice transmission (Block 418), the SU may determine whether the target time slot is idle (Block 412). The target time slot is considered idle if a channel status field in the CACH message indicates an idle channel. Further, for the SU to determine whether the time slot is being used for system wide communication (Block 416), the SU first determines whether the time slot is either idle or busy. This is done by decoding an access type field in the CACH message (Block 412). If the access type field indicates that the time slot is idle, then the SU confirms the idle determination by decoding another CACH message and checking the access type field. If the access type field indicates that the time slot is not idle, then the SU determines whether the SU is a party to the activity on the time slot (Block 414). The SU determines whether it is a party to the activity by observing link control information on the channel. If the link control information indicates that the SU is not a party to the activity, then the SU determines whether the activity on the time slot is being used for system wide activity. If the activity on the time slot is not system wide activity (Block 416), then the SU is allowed access to the channel for voice transmission (Block 418).

Once the SU is finished with voice transmission, the BR transmits a hangtime message whereby hangtime is defined as a period of time beginning at the end of a SU's voice transmission and there is no activity on the uplink. SUs are given the opportunity to request channel access during hangtime and take advantage of the idleness of the uplink. An exemplary embodiment of the present invention divides the traditional period of hangtime into a period of call hangtime and channel hangtime. As used herein, a call ends when the BR transitions to channel hangtime, the BR dekeys, or when the channel is overtaken by an "impolite" transmission.

During call hangtime, the BR sets the channel status bit to busy even though the uplink is not busy. Further, the BR transmits link control information to advertise that SUs that were a party to the call may override the channel status bit and access the channel for voice transmission. Further, because the BR is already keyed, there is no need for a SU to have to wakeup the BR. Specifically, SUs that were a party to the call may access the channel for a new voice transmission not related to the previous call without having to initiate the BR wakeup procedure. Call hangtime begins at the end of a SU voice transmission and ends when channel hangtime begins. In an exemplary embodiment, call hangtime lasts several seconds, e.g. three seconds, after a call.

During channel hangtime, the BR sets the channel status bit to idle which allows any SU to access the channel without first transmitting a BR wakeup sequence. Because the BR is already keyed, there is no need for a SU to have to wakeup the BR. Thus, a SU wanting access to the channel saves time by not having to wakeup the BR. During channel hangtime, the BR transmits an idle TDMA burst to confirm that the channel is not being used and is not reserved for use. Channel hangtime is defined as a period of time beginning at the end of call hangtime and ends when the BR dekeys at the expiration of the SIT. Further, the SIT covers the time of call hangtime plus channel hangtime. In an exemplary embodiment, channel hangtime begins at the end of call hangtime and lasts several seconds, e.g. two seconds.

In an exemplary embodiment of the present invention, a SU considers hangtime and "politeness" before accessing the channel. Specifically, during call hangtime, irrespective of whether a SU is provisioned for "polite" or "impolite" channel access, the SU that is a party to a call may access the channel. Thus, if a SU that is a party to a call receives indication that the channel is in call hangtime, then the SU can request access to the channel. On the other hand, SUs that are not a party to the call may not transmit during call hangtime if the SU is provisioned for "polite" channel access. Thus, SUs that are a party to a call are first provided an opportunity to continue the call before another call is allowed to begin on the channel.

In the case of "impolite" channel access, SUs that are provisioned for "impolite" channel access may begin a voice transmission at any time, including a) during an active transmission by another SU, b) during call hangtime, c) during channel hangtime, and d) even if a BR is not awake. Thus, SUs provisioned for "impolite" channel access ignore the channel status field in the CACH message and do not attempt to distinguish call hangtime from channel hangtime.

Thus, the present invention allows a SU to consider actual conditions on the channel before a voice transmission takes place. By doing so, in many cases, the time to access the channel is reduced. Additionally, the present invention reduces the likelihood that a call will be interrupted by SUs that are not a party to the call but are of the same color-code, thus preserving the continuity of the ongoing call.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

We claim:

1. In a wireless communications system whereby the wireless communications system comprises a plurality of subscriber units and a plurality of base radios, a method for allowing a first subscriber unit to access a channel for voice transmissions, the method comprising the steps of:
   determining that the first subscriber unit is provisioned for polite access to the channel, wherein the first subscriber unit considers what type of communications are currently on the channel before accessing the channel for its own communication, whereby the first subscriber unit is characterized by a first color code and a first talkgroup ID;
   examining the voice transmissions on the channel for voice transmissions that are from a second subscriber unit with a second color code and a second talkgroup ID; and
   if the first talkgroup ID and the second talkgroup ID match, then allowing the first subscriber unit to access the channel for voice transmissions even though the channel is being used for voice transmissions by the second subscriber unit.

2. The method of claim 1 further comprising the step of:
   if the first color code and the second color code match and the first talkgroup ID and the second talkgroup ID match, then allowing the first subscriber unit to access the channel for voice transmissions if the first subscriber unit is within a period of hangtime where the channel is not being used for voice transmissions.

3. The method of claim 2 wherein the hangtime is defined by a period of time beginning after the end of a call.

4. The method of claim 1 further comprising the step of:
   if the first color code and the second color code do not match, then not allowing the first subscriber unit to access the channel for voice transmissions if the first subscriber unit is being used for voice transmissions.

5. The method of claim 1 further comprising the step of determining that the first subscriber unit is provisioned for impolite access to the channel and allowing the first subscriber unit to access the channel for voice transmissions even though the channel is being used for voice transmissions.

6. The method of claim 1 further comprising the step of dekeying a base radio associated with the first subscriber unit when the base radio determines that a specified time period termed Subscriber Inactivity Timer has expired.

7. The method of claim 4 where the Subscriber Inactivity Timer is equal to channel hangtime plus call hangtime.

8. The method of claim 1 further comprising the step of dekeying a base radio associated with the first subscriber unit when the base radio determines that a specified time period termed Time Out Timer has expired.

9. The method of claim 1 wherein the wireless communications system is a TDMA system that has a slotting ratio of at least two.

10. The method of claim 1 wherein the first subscriber unit is characterized by a direct mode whereby the first subscriber unit transmits voice transmissions to a third subscriber unit of the plurality of subscriber units without the assistance of a base radio of the plurality of base radios.

11. The method of claim 1 wherein the first subscriber unit is characterized by a repeater mode whereby the first subscriber unit transmits voice transmissions to a third subscriber unit of the plurality of subscriber units by utilizing a base radio of the plurality of base radios.

12. The method of claim 1 wherein at least one base radio of the plurality of base radios transmits a message indicating that the channel is idle.

13. The method of claim 12 wherein the message is a call hangtime message.

14. The method of claim 13 wherein if the first talkgroup ID matches a talkgroup ID of the call hangtime message then the first subscriber unit is allowed access to the channel for voice transmissions.

15. The method of claim 1 wherein the wireless communications system is a TDMA system.

16. The method of claim 1 further comprising the step of verifying the first color code and the second color code before the step of allowing.

17. In a wireless communications system whereby the wireless communications system comprises a plurality of subscriber units and a plurality of base radios, a method for allowing a first subscriber unit to access a channel for voice transmissions, the method comprising the steps of:
   determining that the first subscriber unit is provisioned for polite access to the channel, wherein the first subscriber unit considers what type of communications are currently on the channel before accessing the channel for its own communication, whereby the first subscriber unit is characterized by a first color code;
   examining the voice transmissions on the channel for voice transmissions that are from a second subscriber unit with a second color code; and
   if the first color code and the second color code do not match, then allowing the first subscriber unit to access the channel for voice transmissions even though the channel is being used for voice transmissions by the second subscriber unit.

18. In a wireless communications system whereby the wireless communications system comprises a plurality of subscriber units and a plurality of base radios, a method for allowing a first subscriber unit to access a channel for voice transmissions, the method comprising the steps of:
   determining that the first subscriber unit is provisioned for polite access to the channel, wherein the first subscriber unit considers what type of communications are currently on the channel before accessing the channel for its own communication, whereby the first subscriber unit is characterized by a first color code and a first talkgroup ID;
   examining the voice transmissions on the channel for voice transmissions that are from a second subscriber unit with a second color code and a second talkgroup ID; and if the first color code and the second color code match and the first talkgroup ID and the second talkgroup ID match, then allowing the first subscriber unit to access the channel for voice transmissions even though the channel is being used for voice transmissions by the second subscriber unit.

* * * * *